(12) United States Patent
Kong

(10) Patent No.: US 9,977,488 B1
(45) Date of Patent: May 22, 2018

(54) ELECTRONIC DEVICE WITH SMART POWER MANAGEMENT SYSTEM

(71) Applicant: Changming Kong, Irvine, CA (US)

(72) Inventor: Changming Kong, Irvine, CA (US)

( * ) Notice: Subject to any disclaimer, the term of this patent is extended or adjusted under 35 U.S.C. 154(b) by 170 days.

(21) Appl. No.: 15/066,286

(22) Filed: Mar. 10, 2016

(51) Int. Cl.
*G06F 1/32* (2006.01)

(52) U.S. Cl.
CPC .......... *G06F 1/3293* (2013.01); *G06F 1/3203* (2013.01)

(58) Field of Classification Search
None
See application file for complete search history.

(56) References Cited

U.S. PATENT DOCUMENTS

| | | | | |
|---|---|---|---|---|
| 5,996,083 A * | 11/1999 | Gupta | ................. | G06F 1/3203 712/E9.049 |
| 8,489,862 B2 * | 7/2013 | Saito | ................. | G06F 1/3203 712/220 |
| 9,286,116 B2 * | 3/2016 | Wang | ................. | G06F 9/4856 |
| 9,442,758 B1 * | 9/2016 | Sakarda | ................. | B60K 7/0007 |
| 9,619,284 B2 * | 4/2017 | Sakarda | ................. | G06F 9/4893 |
| 9,727,388 B2 * | 8/2017 | Jahagirdar | ............. | G06F 9/5083 |
| 9,760,162 B2 * | 9/2017 | Hum | ..................... | G06F 1/3293 |
| 2002/0097031 A1 * | 7/2002 | Cook | ................. | G05B 19/0423 323/273 |
| 2002/0099756 A1 * | 7/2002 | Catthoor | ............. | G06F 17/5045 718/102 |
| 2006/0294407 A1 * | 12/2006 | Rothman | ............. | G06F 1/3203 713/320 |
| 2008/0263324 A1 * | 10/2008 | Sutardja | ................. | G06F 1/3203 712/43 |
| 2014/0380083 A1 * | 12/2014 | Sharifie | ..................... | G06F 1/06 713/502 |
| 2015/0205644 A1 * | 7/2015 | Ito | ............................ | G06F 9/52 718/103 |
| 2017/0329382 A1 * | 11/2017 | Guo | ..................... | G06F 1/3203 |

* cited by examiner

Primary Examiner — Kenny S Lin

(57) ABSTRACT

Described herein are a method and a system for smart power management in electronic devices. Specifically, an electronic device with multiple processors is designed for fitness and health monitoring of a subject. When the device receives a task, it determines whether the task is high power consuming. In response to the determining that the task is high power consuming; the device enables a high-speed processor for the task. Otherwise the device enables a low-speed processor to perform the task.

17 Claims, 6 Drawing Sheets

US 9,977,488 B1

ELECTRONIC DEVICE WITH SMART POWER MANAGEMENT SYSTEM

TECHNICAL FIELD

This application relates generally to an electronic device, and particularly to an electronic device with smart power management system.

BACKGROUND

Portable electronic devices, such as mobile devices or wearable devices, rely on battery power to function. There are often more than one high power-consuming modules need to be on to perform a single task. For example, an activity monitoring device for pets allows the owner to capture content items for certain activities. It can involve high power-consuming modules, such as a camera, a high-speed processor and a WiFi interface. Therefore, there is a need to provide a smart power management system for the electronic devices, so that power consumption is minimized and battery life is optimized.

SUMMARY OF THE INVENTION

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

One or more exemplary embodiments relate to a device comprising: a machine-readable medium encoded with instructions; and a processor configured to execute the instructions to perform a process comprising: receiving a task; determining whether the task is high power consuming; enabling a first processor or a second processor in response to the determining that the task is high power consuming; enabling the second processor in response to the determining that the task is not high power consuming; and performing the task using the first processor or the second processor.

One or more exemplary embodiments further relate to a computer-implemented method comprising: receiving a task; determining whether the task is high power consuming; enabling a first processor or a second processor in response to the determining that the task is high power consuming; enabling the second processor in response to the determining that the task is not high power consuming; and performing the task using the first processor or the second processor.

One or more exemplary embodiments further relate to a non-transitory machine-readable medium encoded with instructions that, when executed by a processor, cause the processor to perform a process comprising: receiving a task; determining whether the task is high power consuming; enabling a first processor or a second processor in response to the determining that the task is high power consuming; enabling the second processor in response to the determining that the task is not high power consuming; and performing the task using the first processor or the second processor.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Embodiments disclosed herein are directed to methods, systems and devices for smart power management in electronic devices.

As described with, many pet owners may be interested in information about their pets, especially when the pets are away from their pet owners. In one example, a content item, such as a photo or video may be captured to record the environmental information and/or contextual information associated with the pets. The content item may be captured when a motion of interest of the pet appears. The motion of interest may be associated with one or more pre-defined activities, such as including running, resting, and/or swimming.

In some aspects, motion data may be captured through an electronic device attached to the subject, such as a pet, a toddler or a senior person that needs monitoring. The captured motion data can be locally processed and stored or periodically uploaded to servers or cloud storage, which can further process the data to generate reports, notifications or alerts for pet owners, parents or care takers. The electronic device may also comprise a camera for recording photos or videos when an activity of interest is predicted.

In one or more embodiments, the electronic device comprises a plurality of sensors, such as an accelerometer and a gyroscope for sensing subject's motions, a biometric sensor for tracking heart beat rate or other biometric information, and an environmental sensor for measuring temperature, ambient light or sound. Data collected by these sensors may be uploaded to the servers and cloud storage for training machine-learning algorithms to generate health models, which in turn helps the device to predict potential health conditions. The device may further comprise control and communication modules embodied in software and/or firmware, for example, smart power management modules to streamlining tasks such that power consumption by the processors, cameras, various sensors and communication modules are minimized and battery life is optimized.

Figure 1:
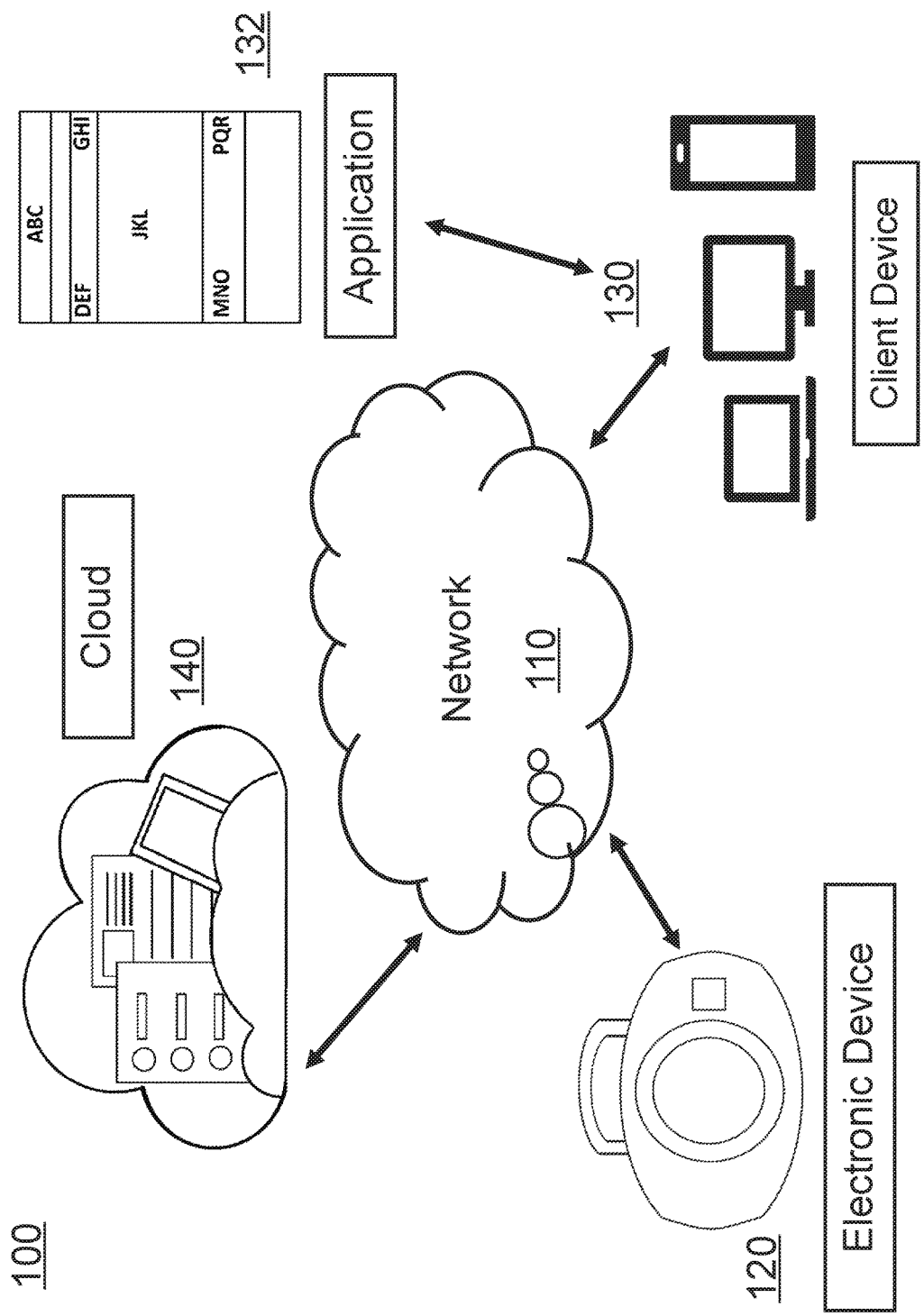
FIG. 1 is a block diagram illustrating an example network environment in which an electronic device may be implemented in accordance with one or more embodiments.

FIG. 1 is a block diagram illustrating an example network environment 100 in which an electronic device may be implemented in accordance with one or more embodiments. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The network environment 100 comprises a communications network 110 and a plurality of entities connected to the network 110, including one or more electronic devices 120, one or more client devices 130 and cloud storage 140. The communication network 110 may include, and/or may be communicatively coupled to, one or more of the Internet, a private network, a wearable devices network, an Internet of things network, or other networks. The network 110 may include one or more wired or wireless network devices that facilitate device communications of the one or more electronic devices 120, the one or more client devices 130, and/or the cloud storage 140. In one or more implementations, the electronic device 120 may establish a direct network connection (e.g. via Bluetooth, near-field communication (NFC), or WiFi etc.) with one or more of the client devices 130 without communicating through the network 110.

The electronic device 120 is depicted in FIG. 1 as a wearable electronic device. However, the electronic device 120 may be any electronic device that senses, collects, and stores information regarding a subject, such as pets, babies, small kids and/or seniors. For example, the electronic device 120 can be activity monitoring devices, network camera devices, heart rate monitoring devices, blood monitoring devices, sleep monitoring devices, or any general device that obtains information about the subject. In other embodiments, besides being a wearable device, the electronic device 120 can also be an implanted and/or implantable device. The electronic device 120 is configured to communicate wirelessly with the client device 130 and the cloud storage 140. For example, the data stored in the device may be uploaded to the cloud storage 140 periodically (e.g., once a day), or whenever cellular or WiFi signal is available. An example electronic device 102 is discussed further below with respect to FIG. 2.

The information captured by the electronic device 120 may include activity information, biometric information, images and videos, among other information. In one embodiment, the electronic device 120 is configured to capture and store data through motion sensors, such as an accelerometer for measuring acceleration, a gyroscope for measuring orientation, or a combination thereof, which is sometimes referred as Inertial Measurement Unit (IMU). Alternatively, or in addition, the electronic device 120 comprises one or more biometric sensors to obtain the subject's biometric information, such as hear rate, blood pressure, and skin colorization. The electronic device 120 may also comprise cameras, such as photo cameras or video cameras, for recording images, voices or videos relating to the subject and/or the subject's activities. For example, the electronic device 120 can be attached to a pet, such as a dog, a cat or any other pet, to be monitored. When a pre-defined motion of interest (e.g., resting, walking, or playing) is detected, accelerometer and gyroscope data may be captured and processed in the device 120. In some circumstances, such motion data can be compared to the behavior patterns of the pet, so as to detect early symptoms of potential health conditions and to trigger an alarm to the pet owner.

The client device 130 is connected to the network 110 to receive the information captured by the electronic device 120 using a client application. The client device 130 includes a personal computer (e.g., a desktop, laptop, or netbook), a tablet computer, a personal digital assistant (PDA), a pager, a mobile or smart phone, a wireless sensor, any consumer electronic devices (e.g., a set-top box) and the like. In some cases, the electronic device 120 directly transfers the activity data, biometric information, and images and videos of the device subject to the client device 130 in a form of "live" feed. In other cases, the information or data captured and recorded by the electronic device 120 can be first uploaded to the cloud storage 140, and retrieved by the client device 130 later across the network 110.

The client device 130 is configured with computer software, executable programs, algorithms, functional modules and processes for receiving information and data regarding the subject of the electronic device 120. An exemplary application 132 is illustrated in FIG. 1 according to one or more embodiments. Such an application can be downloaded and installed on the client device 130, for example, through a digital distribution platform for computer software. Various versions and updates of the application 132 can be provided in order to be compatible with different PC or mobile operating systems.

As illustrated in FIG. 1, the application 132 allows a pet owner to keep track of his or her pet's activities on a real-time basis and/or check past records of the pet logged in the cloud storage 140. In general, the application 132 can include a login or registration module for owners to manage their profile or account information, a primary user interface that integrates most functions of the application, and a configuration or settings module. For instance, the primary user interface of the application 132 may allow the owners to view photos or videos of their pets, and receive reports or alerts of their pets' activities and health conditions.

The cloud storage 140 usually comprises multiple grids or nodes configured to store large amounts of data from various data sources. In one embodiment, at least one back-end server in the cloud storage 140 is programmed with a data processing algorithm or web-based application for analyzing and processing the raw sensor data (e.g., motion data from accelerometer and gyroscope, photo images, and videos etc.) uploaded by the electronic device 120. The data processing algorithm combines the raw sensor data with other contextual information, such as time of the day and type of the environment, to perform data analyses and generate useful reports for the pet owners. The sensor data analyses and generated reports can be either stored in the cloud storage 140 or transmitted to the client device 130. As an example, one such report may be pulled by or pushed to a client device to show the pet owner of her pets' behavior patterns, abnormal activities, or indications of existing or potential health conditions.

It should be appreciated that the network environment 100 in FIG. 1 is for illustration purpose only and can be implemented with many variations without departing from the spirit of the disclosure. For instance, the cloud storage 140 may include multiple computers and stations distributed in different locations. In some embodiments, the electronic device 120 and/or the client device 130 may preprocess the sensor data before uploading the data to the cloud storage 140 for analyses.

Figure 2:
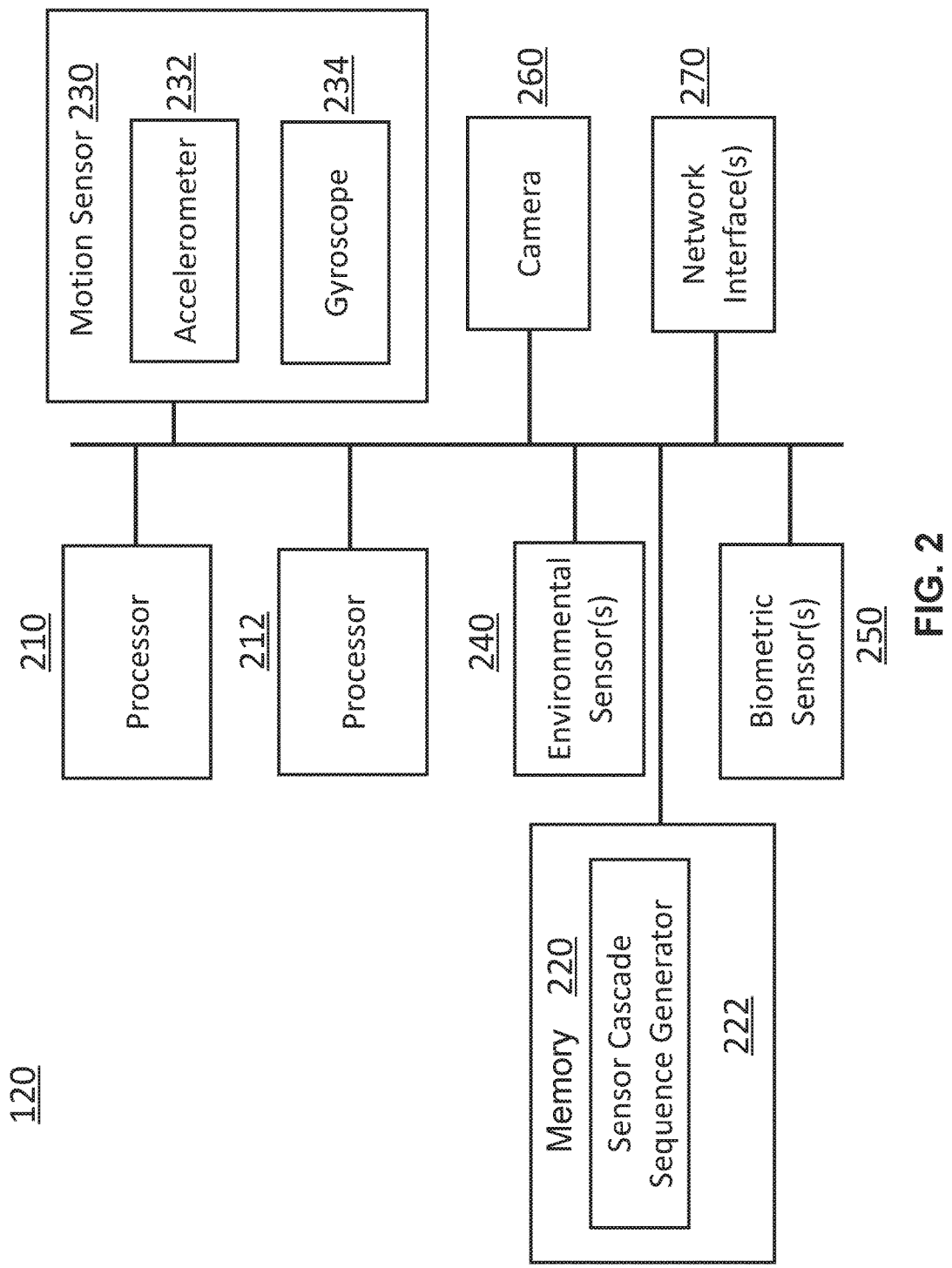
FIG. 2 is a block diagram illustrating an example electronic device that implements the smart power management system in accordance with one or more embodiments.

FIG. 2 is a block diagram illustrating an example electronic device that implements the smart power management system in accordance with one or more embodiments. Note that not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The electronic device 120 can be any smart device that senses, collects, and stores information about a subject, which may include a pet, a toddler or a senior person. As shown in FIG. 2, the electronic device 120 comprises two processors 210 and 212, a memory 220 accessible by the processors 210 and 212, one or more network interfaces 270 and a plurality of sensors configured to communicate with the processors 210 and 212 and the memory 220, including, but not limited to, one or more motion sensors 230, environmental sensors 240, biometric sensors 250, and cameras 260. The motion sensors 230 further include an accelerometer 232 for measuring acceleration and a 234 gyroscope for measuring orientation. The one or more environmental sensors 240 may include a GPS for location information, an optical sensor for sensing ambient light, and a thermometer for measuring temperature of the environment. The network interfaces 270 can be a Bluetooth interface, an NFC network interface, a WiFi interface, a Zigbee RF4C interface, and the like.

In some embodiments, the processors 210 and 212 are separate central processing units (CPUs) that work in parallel. Alternatively, the processors 210 and 212 can be separate cores embedded in the same central processing unit. In the following description, it is assumed that the processor 210 is a more powerful CPU with higher speed than the processor 212 and thus consumes more power, whereas processor 212 is of lower speed and suitable for low power consuming tasks. Depending on the tasks, the electronic device 120 may schedule either or both of the processors required to carry out the task while optimize the power management.

The memory 220 may be any memory, such as dynamic random-access memory (DRAM). While the memory 220 is shown as separate from the processors 210 and 212, all or a portion of the memory 220 may be embedded in the processors 210 and 212. As illustrated in FIG. 2, the memory 220 stores various programs, modules and data structures, or a subset thereof, including but not limited to, a sensor cascade sequence generator 222. In practice, the processors 210 and 212 are configured to execute the sensor cascade sequence generator 222 stored in the memory 220 to accomplish smart power management functions of the electronic device 120, as will be described in detail below.

In one or more implementations, one or more of the processors 210 and 212, the memory 220, the one or more network interfaces 270, and the data sensor cascade sequence generator 222, may be implemented in software (e.g., subroutines and code). In one or more implementations, the processor 210, the memory 220, the one or more network interfaces 270, and the data sensor cascade sequence generator 222 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
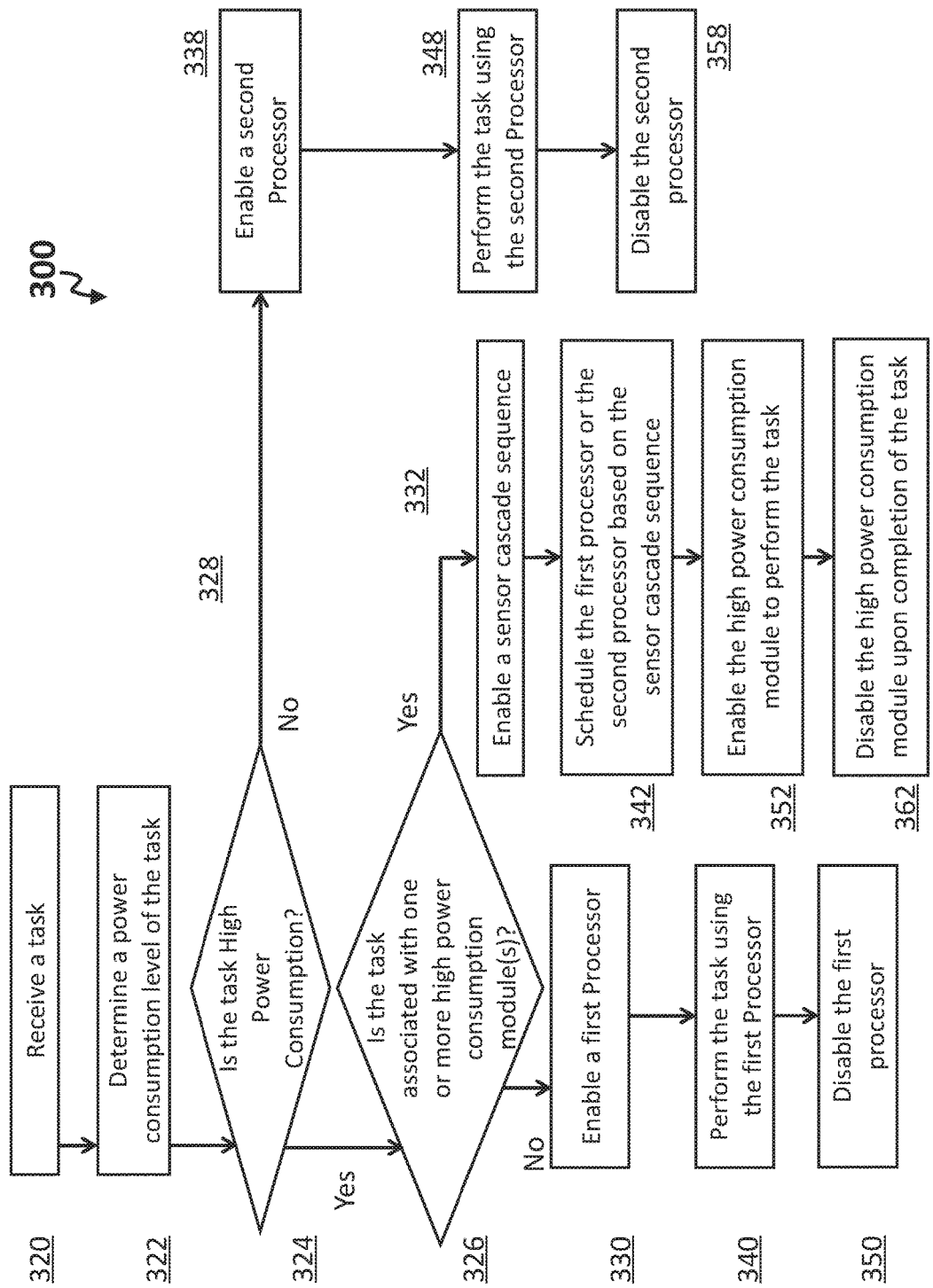
FIG. 3 is a flow diagram illustrating an example process of the smart power management system in accordance with one or more embodiments.

FIG. 3 is a flow diagram illustrating an example process 300 of the smart power management system in accordance with one or more embodiments. In one or more embodiments, the example process 300 is primarily described herein with reference to electronic device 120 of FIGs. For explanatory purposes, the steps of the example process 300 are described herein as occurring in serial, or linearly. However, multiple steps of the example process 300 may occur in parallel. In addition, the steps of the example process 300 may be performed a different order than the order shown and/or more or less steps of the example process 300 may be performed.

The process 300 starts when the electronic device 120 receives (step 320) a task. The task may include, for example, monitoring activities of a pet (or any other subjects of the device) using the motion sensors 230 (e.g., the accelerometer 232 and the gyroscope 234) and/or the biometric sensors 250 (e.g., heart rate monitors), or taking pictures or videos of the pet by the camera 260 when certain activities are detected and uploading the captured pictures and videos to the cloud server 140 through network interface (s) 270 (e.g., WiFi or cellular 2G/3G/4G).

The electronic device 120 then determines (step 322) the power consumption level of the task. In one or more embodiments, the power consumption level of the task can be simply categorized as either high or low level. Any tasks that involve at least one high power consumption module, such as the camera 260, the network interfaces 270, and the high-speed processor 210, are deemed high power consumption task. For example, shooting video with the camera 260 and/or uploading data to the cloud server through WiFi or cellular connections are among high power consuming tasks. These tasks often depend on cooperation from other sensors, such as motion sensors 230, environmental sensors 240, and biometric sensors 250, to provide data feeds or condition checks, which include but not limited to motion data, light, sound, temperature, humidity, geo-location, body temperature, blood pressure, and heart beat rate, among other information. For example, video shooting may depend on the ambient light condition reported by an optical sensor. As another example, uploading of biometric information is only triggered when the motion sensors 230 and environmental sensors 240 detect certain activities and WiFi signal is present. Therefore, smart power management adopted by the electronic device 120 would only turn on the high power consuming modules at the best timing (e.g., after the confirmation of sufficient ambient light or the detection of an activity) to optimize the battery life. Some high power-consuming tasks may not involve any other sensors, but instead require a lot of computing power and/or memory I/O operations from the high-speed processor 210. For example, analyzing subject's motion data for activity pattern recognition by the electronic device 120 demands a powerful processor and heavy memory I/O.

If so determined (step 324) that the task is high power consuming, the electronic device 120 next determines (step 326) whether the task is associated with one or more high power consumption modules. As described above, high power consuming tasks may or may not involve a high power consumption module, such as the camera 260 and network interface 270. If the task is not associated with one or more high power consuming modules, the electronic device 120 enables (step 330) the more powerful processor 210 to perform (step 340) the task that comprises heavy computations and/or memory read/write operations. After the task is completed, the electronic device 120 disables (step 350) the first processor 210.

Otherwise the task is associated with one or more high power consuming modules. The electronic device 120 determines (step 332) a sensor cascade sequence for the task. As described above, high power consuming modules may depend on corporations from other sensors, such as motion sensors 230, environmental sensors 240, and biometric sensors 250, to provide data feeds or condition checks. Subsequently, the electronic device 120 schedules (step 342) either processor of the processors 210 and 212 for the task based on the sensor cascade sequence. Once the prerequisite of the task has been done, the electronic device 120 enables (step 352) the high power-consuming module to perform the rest of the task. The electronic device 120 disables (step 362) the high power-consuming module upon the completion of the task.

On the other hand, if it is determined (step 324) that the task is not a high power consuming task, the electronic device 120 enables (step 338) the second processor 212 suitable for low power consumption tasks. After performing (step 348) the task using the low power processor 212, the electronic device 120 disables (step 358) the second processor 212.

Figure 4:
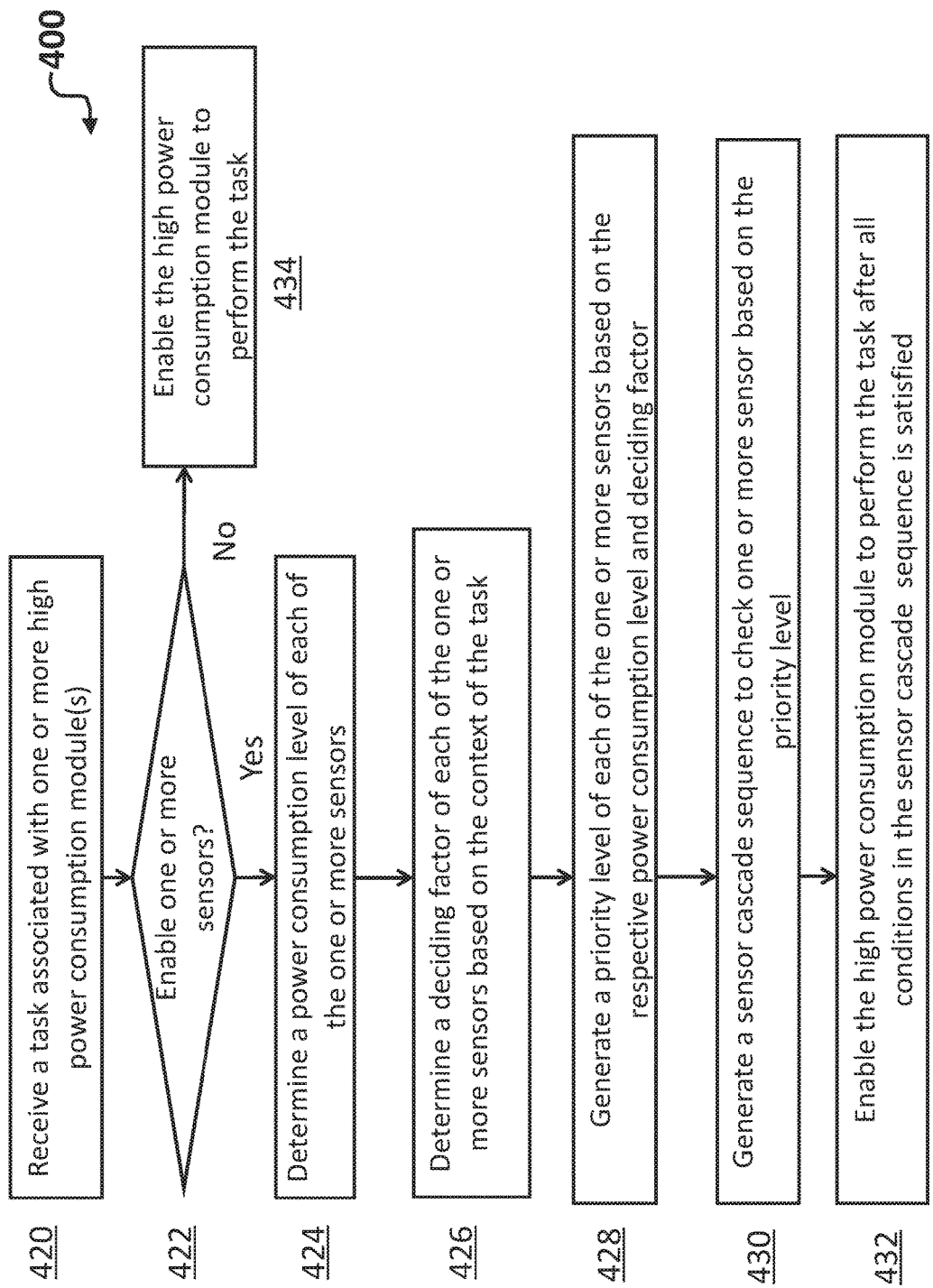
FIG. 4 is a block diagram illustrating another example process the smart power management system in accordance with one or more embodiments.

FIG. 4 is a block diagram illustrating another example process 400 the smart power management system in accordance with one or more embodiments. The example process 400 starts when the electronic device 120 receives (step 420) a task associated with one or more high power-consuming modules. For example, the electronic device 120 allows a pet owner to capture content items (e.g., photos or videos) when the pet is playing in the park. This content item capturing task involves high power-consuming camera 260 and network interfaces 270.

Next, the electronic device 120 determines (step 422) whether to enable one or more sensors for the task. The one or more sensors may include motion sensors 230, environmental sensors 240, and biometric sensors 250. If no sensor is needed, the electronic device 120 simply enables (step 434) the high power-consuming module to perform the task. On the other hand, if one or more sensors need to be enabled to provide data feeds or condition checks for the task, the electronic device 120 next determines (step 424) a power consumption level of each sensor needed for the task. For instance, the content item capturing task may require input from motion sensors and/or environment sensors. The power consumption levels of each of the required sensors are at different levels, for instance, the optical sensor for ambient light is a low power sensor, where GPS and network interfaces are much more power consuming. Generally, the power consumption levels of various sensors ranked from lowest to highest are: clock, motion sensors (e.g., accelerometer and gyroscope), environment sensors (e.g., light, sound, temperature, and humidity sensors), biometric sensors (body temperature, blood pressure, and heart rate sensors), oscillating vibrator, and GPS.

The electronic device 120 further determines (step 426) a deciding factor of each of the one or more sensors based on the context of the task. In the content item capturing example, the deciding factors of the sensors include ambient light check for the video capture, motion and/or location detection of the pet to confirm the pet playing in the park, and availability of the network connection for capturing, which require input from the optical sensor, motion sensors, GPS and/or network interfaces respectively.

Based on the power consumption level of each sensor and the deciding factor, the electronic device 120 then generates (step 428) a priority level for each of the one or more sensors. Subsequently, the electronic device 120 generates (step 430) a sensor cascade sequence to check on the one or more sensors based on the priority levels of the sensors. Once all conditions in the sensor cascade sequence are satisfied, the electronic device 120 enables (step 432) the high power-consuming module to perform the task.

In one or more embodiments, the smart power management implemented by the electronic device 120 serializes the process steps involving the one or more sensors by generating a sensor cascade sequence. A priority (i.e., a position in the sensor cascade sequence) may be determined for each of the one or more sensors based on the importance of the sensor in a deciding logic to perform a task and power consumption of the sensor. For example, to perform a task such as capturing a photo, a motion sensor may be assigned to a highest priority (i.e., a highest position in the sensor cascade sequence), as a prerequisite in a deciding logic for capturing a photo as well as a low power assumption. An environmental sensor may be assigned to a second highest priority (i.e., a second highest position in the sensor cascade sequence), as a second important sensor in a deciding logic for capturing a photo as well as a low power assumption.

Only when the early stage conditions from lower power consuming sensors are satisfied, the process continues to the next stage, otherwise the process ends without enabling of sensors with higher power consumption. More details of the sensor cascade sequence are described in reference to FIG. 5 below.

Figure 5:
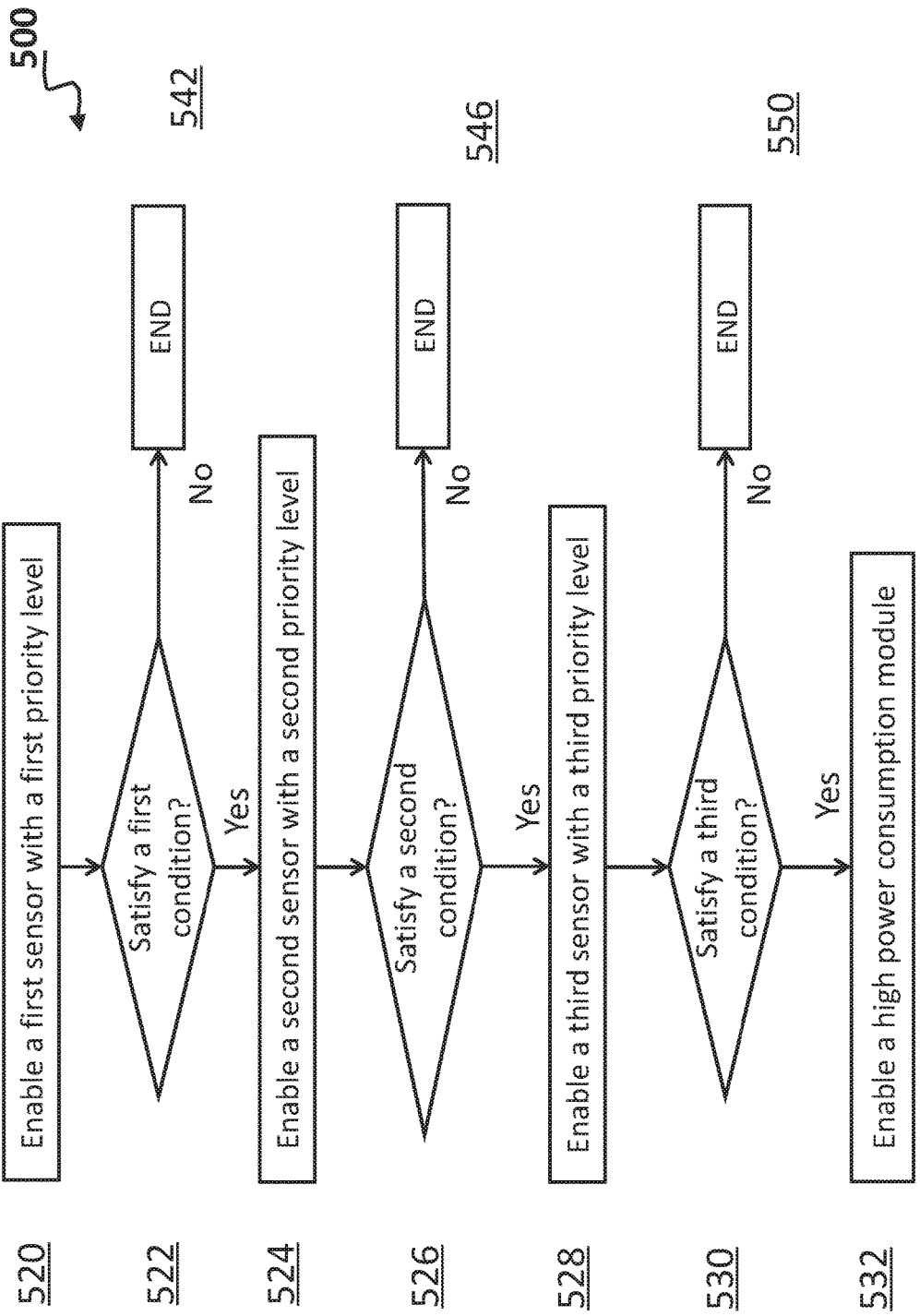
FIG. 5 is a block diagram illustrating an example process for scheduling sensor cascade sequence in accordance with one or more embodiments.

FIG. 5 is a block diagram illustrating an example process for scheduling sensor cascade sequence in accordance with one or more embodiments. First, the electronic device 120 enables (step 520) a first sensor with a first priority level. The electronic device 120 then determines (step 522) whether the check on the first sensor satisfies a first condition. If the condition is not satisfied, the process ends (step 542). Using the above content item capturing as an example, the first sensor check may be the optical sensor for determining if there is sufficient ambient light for video capturing. If ambient light is not sufficient or the pet is at rest, the content item capturing task can be put to an end.

Otherwise the process continues as the electronic device 120 enables (step 524) a second sensor with the second priority level. The electronic device 120 then determines (step 526) whether the check on the second sensor satisfies a second condition. If the condition is not satisfied, the process ends (step 546). For example, the second priority check for the content item capturing task may include checking the motion data from the accelerometer 232 or the gyroscope 234 for deciding if the pet is at rest. If the pet is at rest, the content item capturing task can be terminated for not meeting the condition.

On the other hand, if the second condition is satisfied, the electronic device 120 continues to enable (step 528) a third sensor with the third priority level. The electronic device 120 then determines (step 530) whether the check on the third sensor satisfies a third condition. If the condition is not satisfied, the process ends (step 550). Otherwise, the electronic device 120 enables (step 532) the high power-consuming module to perform the task. For example, the third priority check for the content item capturing task can be checking the availability of network connection between the electronic device 120 and the client device 130 by turning the network interface module on. If there is network connection exist by searching a network signal, the electronic device 120 can connect via the network connection to transmit data, such as data of content items. Upon the data transmission is completed, the client device 130 may turn off the network interface module. If there is no network connection exist, the electronic device 120 would turn off the network interface 270 and end the process. Otherwise, all the condition checks in the sensor cascade sequence have been satisfied, the electronic device 120 can turn on the high power-consuming modules including the camera 260 and the network interface 270, and start capturing the content items and send to the client device 130.

Figure 6:
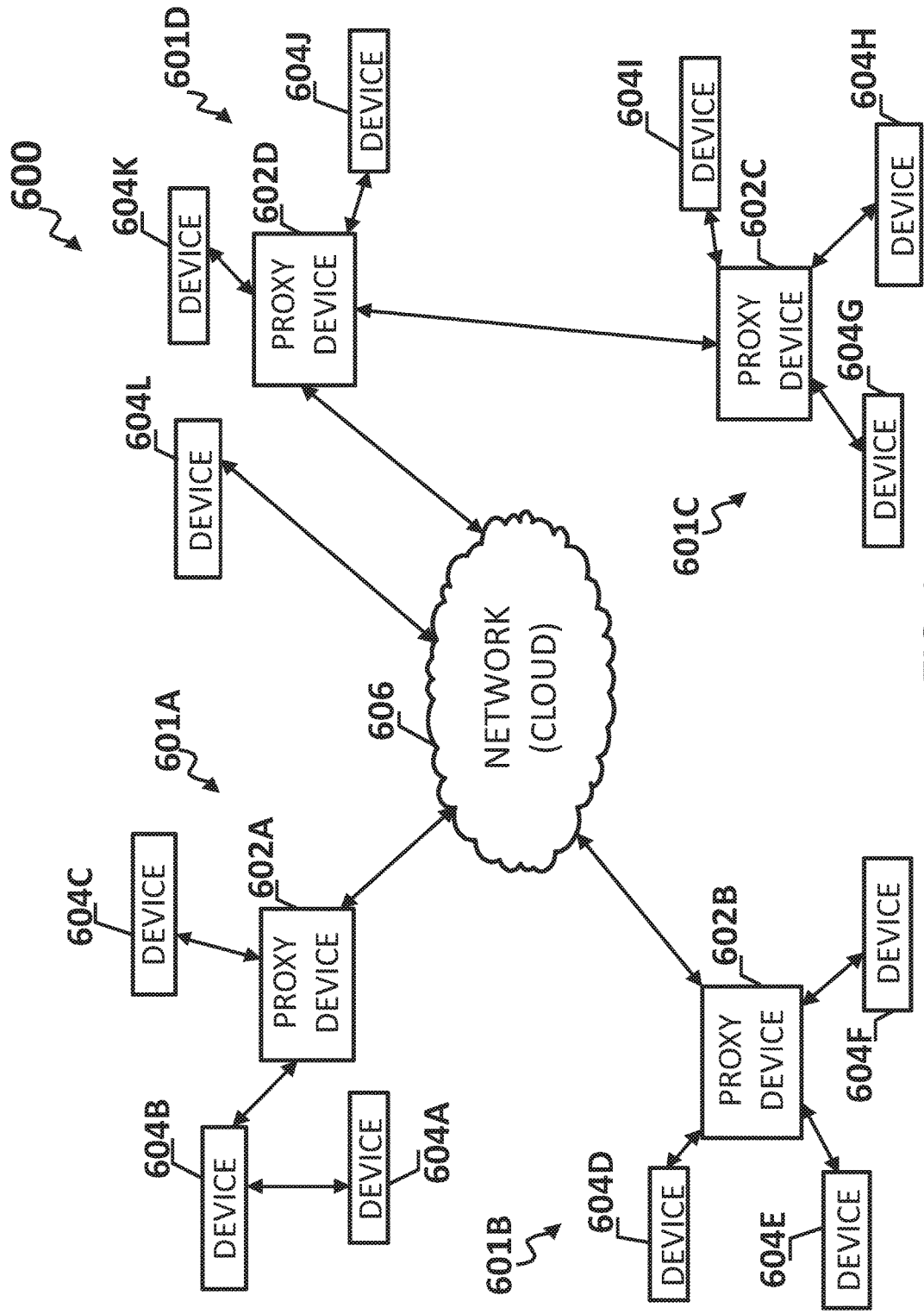
FIG. 6 is a block diagram illustrating an example network environment that may implement one or more proxy devices for one or more networks of devices in accordance with one or more implementations.

FIG. 6 illustrates an example network environment 600 that may implement one or more proxy devices 602A-D for one or more networks 601A-D of devices 604A-L in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example network environment 600 includes devices 604A-L and proxy devices 602A-D that collectively form, and/or are a part of, one or more of the networks 601A-D. The example network environment 600 also includes a network 606.

In some implementations, proxy devices 602A-D may communicate with devices 604A-L to implement a smart power management system in accordance with one or more embodiments as described in FIG. 4. In one example, proxy devices 602A-D may communicate with devices 604A-L to schedule a sensor cascade sequence in accordance with one or more embodiments as described in FIG. 5.

The network 606 and/or one or more of the networks 601A-D may include, and/or may be communicatively coupled to, one or more of the Internet, a private network, an internet of things network, or other networks. The network 606 and/or one or more of the networks 601A-D may include one or more wired or wireless network devices that facilitate device communication, such as switch devices, router devices, relay devices, etc., and/or may include one or more servers. In one or more implementations, the network 606 and/or one or more of the networks 601A-D, may be, or may include, a cloud of computers. In one or more implementations, the network 606, and/or one or more of the networks 601A-D, may be referred to as an Internet of things (IOT) network and/or a machine-to-machine (M2M) network. In one or more implementations, one or more of the devices 604A-L may be referred to as an IOT device and/or an M2M device.

In one or more implementations, one or more of the devices 604A-L may include, or may be, a sensor device that may be configured to measure a physical quantity and convert the physical quantity into a signal. In one or more implementations, the devices 604A-L may include temperature sensors, video cameras, audio recorders, motion sensors, humidity sensors, smoke detectors, various gas sensors, radiation monitors, security sensors, such as door and/or window sensors, biometric sensors, wearable devices/sensors, implantable devices/sensors, embedded devices/sensors and/or any other devices/sensors. In some aspects, a sensor device may be a smart sensor that includes, but is not limited to, processing logic such as one or more controllers or processors, memory, and communication interfaces. In one or more implementations, one or more of the devices 604A-L may include, may be embedded in, and/or may be communicatively coupled to a portable device such as a portable communication device including a mobile phone, a laptop, a tablet, or any other communication device. In one or more implementations, one or more of the devices 604A-L may be action devices, such as actuators, alarm devices, automated devices, or any other devices that are capable of performing one or more actions.

In one or more implementations, one or more of the devices 604A-L, such as the device 604A, may be any device that is capable of communicating with one or more of the other devices 604B-L, the proxy devices 602A-D, and/or the network 606. In one or more implementations, one or more of the devices 604A-L may be communicatively coupled to one or more of the proxy devices 602A-D and/or the network 606 through one or more of the other devices 604A-L. In FIG. 6, the device 604A, such as a smart watch, may be communicatively coupled to the device 604B, such as a mobile phone, via a first network connection, such as a Bluetooth connection, and the device 604B may be communicatively coupled to the proxy device 602A via a second network connection, such as a WiFi network connection. Thus, the device 604A may be communicatively coupled to the proxy device 602A via a combination of the first network connection between the device 604A and the device 604B and the second network connection between the device 604B and the proxy device 602A. In one or more implementations, the network connection between the device 604A and the proxy device 602A, may be referred to as a transient network connection and/or a dependent network connection, since the network connection depends on the device 604B being proximally located to the device 604A, e.g. within Bluetooth range of the device 604B.

In one or more implementations, one or more of the devices 604A-L may be communicatively coupled to the network 606 through one or more of the proxy devices 602A-D, and/or one or more of the devices 604A-L may be communicatively coupled to one or more of the proxy devices 602A-D through the network 606. In FIG. 6, the device 604L may be associated with the network 606D and/or part of the network 601D on a transient basis, but located externally to network 601D, and therefore may be communicatively coupled to the proxy device 602D via the network 606.

One or more of the proxy devices 602A-D may include one or more wired or wireless network devices that facilitate device communication, such as router devices, switch devices, relay devices, etc. In one or more implementations, one or more of the proxy devices 602A-D may include, and/or may be coupled to, multiple different network interfaces, such as a WiFi network interface, a Bluetooth network interface, a coaxial network interface, an Ethernet network interface, an optical network interface, or generally any interface that facilitates communicatively coupling one or more of the proxy devices 602A-D with one or more of the devices 604A-L. In one or more implementations, the proxy devices 602A-D may be, or may include, home gateway devices such as set top boxes (STBs). In one or more implementations, one or more of the proxy devices 602A-D may be a device that is communicatively coupled to one or more of the networks 601A-D, but does not facilitate communication for the devices 604A-L of the networks 601A-D.

In one or more implementations, one or more of the proxy devices 602A-D may be communicatively coupled to one or more of the devices 604A-L through one or more of the networks 601A-D. For exemplary purposes, the networks 601A-D are illustrated as each including multiple of the devices 604A-L; however, one or more of the networks 601A-D may include only one of the devices 604A-L. In one or more implementations, one or more of the networks 601A-D may be, or may include, one or more of a bus network, a star network, a ring network, a relay network, a mesh network, a star-bus network, a tree or hierarchical network, and the like. In FIG. 6, the proxy device 602A may form the network 601A with the devices 604A-C, the proxy device 602B may form the network 601B with the devices 604D-F, the proxy device 602C may form the network 601C with the devices 604G-I, and the proxy device 602D may form the network 601D with the devices 604J, K. In one or more implementations, there may be multiple paths between one or more of the proxy devices 602A-D and the devices 604A-L. In one or more implementations, there may be multiple paths between one or more of the devices 604A-L and/or the proxy devices 602A-D, and the network 606.

In one or more implementations, one or more of the proxy devices 602A-D, such as the proxy device 602A, may be communicatively coupled to one or more of the devices 604A-L, such as the device 604A, through one or more of the other devices 604B-L, such as the device 604B. In one or more implementations, one or more of the proxy devices 602A-D, such as the proxy device 602D, may be communicatively coupled to one or more of the devices 604A-L, such as the devices 604G-I, through one or more of the other proxy devices 602B-D, such as the proxy device 602C. In one or more implementations, one or more of the proxy devices 602A-D, such as the proxy device 602D, may be communicatively coupled to one or more of the devices 604A-L, such as the device 604L, through the network 606. In one or more implementations, one or more of the proxy devices 602A-D, such as the proxy device 602C, may be communicatively coupled to the network 606 through one or more of the other proxy devices 602A, B, D, such as the proxy device 602D.

In one or more implementations, one or more of the networks discussed herein may refer to the network 606, a portion of the network 606, one or more of the networks 601A-D, and/or a portion of one or more of the networks 601A-D. In one or more implementations, the proxy devices discussed herein may refer to one or more of the proxy devices 602A-D and/or a portion of one or more of the proxy devices 602A-D. In one or more implementations, the devices discussed herein may refer to one or more of the devices 604A-L, and/or a portion of one or more of the devices 604A-L. In view of the large number of devices 604A-L that may be part of, and/or associated with, the networks 601A-D, and the associated complexity of managing and/or communicating with the devices 604A-L, one or more of the proxy devices 602A-D may operate as a proxy for the devices 604A-L that are part of, and/or associated with the networks 601A-D.

One or more of the devices 604A-L may be configured to transmit data, such as data generated from measured physical quantities, in different formats and/or at different times, such as at periodic intervals, e.g. every millisecond, every second, every minute, etc., on a periodic basis based at least in part on operating parameters/variables of one or more of the devices 604A-L, e.g. power constraints, at times determined based at least in part on fluctuations in measured physical quantities, at times determined based at least in part on network connection availability, such as transient network connection availability, and/or at times determined based at least in part on network bandwidth availability, such as during off-peak hours. In order to conserve network resources, instead of forwarding data transmitted by one or more of the devices 604A-L (e.g. external to the networks 601A-D) at the time that the data is received by one or more of the proxy devices 602A-D, such as every millisecond, the proxy devices 602A-D may intercept data transmitted by one or more of the devices 604A-L, e.g. at different times, cache and aggregate the intercepted data, and subsequently forward the intercepted data, e.g. in aggregate, when the data is requested by an application and/or device, at less frequent intervals, and/or at different times (e.g. off-peak hours), than the data is being transmitted by the devices 604A-L. In one or more implementations, one or more of the proxy devices 602A-D may also compress the aggregated data.

One or more of the devices 604A-L may have limited or no processing resources and therefore may have limited configurability with respect to the amount of data generated and/or transmitted. Thus, one or more of the devices 604A-L may generate and/or transmit a large amount of data, some of which may be redundant and/or of low value. For example, a temperature sensor may transmit temperature data every millisecond, even when the temperature is substantially constant for an extended period of time, such as several thousand milliseconds. Similarly, a door sensor may transmit a value every millisecond that indicates whether the door is open or closed, even when the door remains closed for an extended period of time, such as several million milliseconds. Thus, in order to conserve network resources, one or more of the proxy devices 602A-D may filter, and/or otherwise process, data intercepted and/or received from one or more of the devices 604A-L, e.g. in accordance with a policy. For example, one or more of the proxy devices 602A-D may filter the received temperature data and/or door sensor data that is redundant.

In one or more implementations, one or more of the devices 604A-L may have a limited power supply and therefore may only have sufficient power to transmit data on a periodic basis, such as a daily basis. For example, one or more of the devices 604A-L may be solar-powered and may charge via one or more solar panels for a period of time, such as a day, in order to generate enough power to transmit data to one or more of the proxy devices 602A-D and/or the network 606. Similarly, one or more of the devices 604A-L may be connected to one or more of the proxy devices 602A-D, and/or the network 606, via a transient network connection and therefore may have limited and/or intermittent network availability. Thus, one or more of the devices 604A-L may not be available to respond to an action request and/or a data request from an application and/or device. However, one or more of the proxy devices 602A-D may emulate one or more of the devices 604A-L when the devices 604A-L, such as when the devices 604A-L are unavailable. In this manner, the devices 604A-L may appear online to requesting applications and/or devices, even when the devices 604A-L are offline, in low power mode, and/or are otherwise unavailable.

In one or more implementations, one or more of the proxy devices 602A-D may store a state, or status, of the devices 604A-L that are part of, and/or associated with, the networks 601A-D of the proxy devices 602A-D, respectively. The states of the devices 604A-L may include, for example, offline, online, low-power mode, sleep mode, intermittent network availability mode, etc. One or more of the proxy devices 602A-D, such as the proxy device 602A, may intercept action requests intended for one or more of the devices 604A-L, such as the device 604A, determine if the intended device 604A is in a state in which the device 604A can respond to an action request, forward the action request to the device 604A when the device 604A is in a state to respond to the action request, or respond to the action request on behalf of the device 604A when the device 604A is not in a state in which the device 604A can respond to the action request. The proxy device 602A may respond to the action request in such a manner that it appears to the requesting application and/or device that the device 604A responded to the action request. For example, the proxy device 602A may intercept a data request and respond with cached data that was previously received from the device 604A and using a network identifier associated with the device 604A as the source network identifier.

In one or more implementations, the proxy device 602A may manipulate the cached data to provide estimated data, such as data estimated based at least on statistical models generated by the proxy device 604A over time based at least on data previously received from the device 604A, and/or data previously received from devices 604B-L similar to, and/or in a similar operating environment as, the device 604A. In one or more implementations, the proxy device 602A may be located remotely from the devices 604A, such as in a data center and/or in a cloud of computers, and the proxy device 602A may be configured to remotely intercept action requests intended for the device 604A.

In one or more implementations, one or more of the devices 604A-L may generate sensitive and/or personal data, such as biometric and/or biomedical data, and/or data from which an individual person, or household, may be identifiable. The biometric data may be transmitted to multiple different applications and/or devices, such as an application associated with a healthcare provider treating the individual person, and/or an application associated with an insurance provider for the individual person. The individual person may permit the biometric data to be transmitted to the healthcare provider in an identifiable format; however the individual person may only permit the biometric data to be provided to the insurance provider in a non-identifiable format. Thus, one or more of the proxy devices 602A-D may be configurable to apply privacy policies, e.g. on a per application/device basis, to the data generated by one or more of the devices 604A-L. In one or more implementations, one or more of the proxy devices 602A-D may provide datagram-based privacy, e.g. privacy on each individual packet.

In one or more implementations, one or more of the devices 604A-L, such as the device 604K, may include, and/or may be, a portable device, such as a mobile device, a wearable device, or any other device that may not always be located within the network 601D and/or directly coupled to the proxy device 602D. Thus, when the device 604K is not located within the network 601D and/or directly coupled to the proxy device 602D, or when the proxy device 602D is located remotely from the network 601D, the proxy device 602D may receive and store the data from the device 604K forwarded through one or more of other networks 606, 601A-C, and/or devices 604A-J that the device 604K is communicatively coupled to. In this manner, one of the proxy devices 602A-D, such as the proxy device 602D can monitor the status of, and/or respond to action requests on behalf of, the device 604K, even when the device 604K is not located within the network 601D.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   a machine-readable medium encoded with instructions; and
   one or more processors configured to execute the instructions to perform a process, comprising:
   receiving a task;
   determining whether the task is high power consuming;
   determining whether the task is associated with one or more high power-consuming modules in the device, in response to the determining that the task is high power consuming;
   determining whether the task is associated with one or more sensors in the device, in response to the determining that the task is associated with one or more high power-consuming modules in the device;
   enabling the high power-consuming modules to perform the task, in response to the determining that the task is not associated with one or more sensors in the device;
   enabling a second processor in response to the determining that the task is not high power consuming; and
   performing the task using a first processor or the second processor.

2. The device of claim 1, wherein the first processor is a high-speed processor and the second processor is a low-speed processor.

3. The device of claim 1, the process further comprises:
   in response to the determining that the task is not associated with one or more high power-consuming modules in the device, enabling the first processor to perform the task.

4. The device of claim 1 the process further comprises:
   in response to the determining that the task is associated with one or more sensors in the device:
   determining a power consumption level for each of the one or more sensors;
   determining a deciding factor of each of the one or more sensors based on context of the task;
   generating a priority level of each of the one or more sensors based on the respective power consumption level and deciding factor;
   generating a sensor cascade sequence to check each of the one or more sensors based on the priority level; and
   enabling the high power-consuming modules to perform the task.

5. The device of claim 4, generating the sensor cascade sequence comprises:
   enabling a first sensor with a first priority level;
   determining whether a first condition at the first sensor is satisfied;
   terminating the process in response to determining that the first condition is not satisfied;
   enabling a second sensor with a second priority level in response to determining that the first condition is satisfied;

determining whether a second condition at the second sensor is satisfied; and terminating the process in response to determining that the second condition is not satisfied.

6. The device of claim 5, generating the sensor cascade sequence further comprises:

enabling a third sensor with a third priority level;

determining whether a third condition at the third sensor is satisfied; and terminating the process in response to determining that the third condition is not satisfied.

7. A computer-implemented method, comprising:

receiving a task by a device;

determining whether the task is high power consuming;

determining whether the task is associated with one or more high power-consuming modules in the device, in response to the determining that the task is high power consuming;

determining whether the task is associated with one or more sensors in the device, in response to the determining that the task is associated with one or more high power-consuming modules in the device;

enabling the high power-consuming modules to perform the task, in response to the determining that the task is not associated with one or more sensors in the device;

enabling a first processor in response to the determining that the task is high power consuming;

enabling a second processor in response to the determining that the task is not high power consuming; and performing the task using the first processor or the second processor.

8. The computer-implemented method of claim 7, wherein the first processor is a high-speed processor and the second processor is a low-speed processor.

9. The computer-implemented method of claim 7 further comprises:

in response to the determining that the task is not associated with one or more high power-consuming modules in the device, enabling the first processor to perform the task.

10. The computer-implemented method of claim 7 further comprises:

in response to the determining that the task is associated with one or more sensors in the device:

determining a power consumption level for each of the one or more sensors;

determining a deciding factor of each of the one or more sensors based on context of the task;

generating a priority level of each of the one or more sensors based on the respective power consumption level and deciding factor;

generating a sensor cascade sequence to check each of the one or more sensors based on the priority level; and enabling the high power-consuming modules to perform the task.

11. The device of claim 10, generating the sensor cascade sequence comprises:

enabling a first sensor with a first priority level;

determining whether a first condition at the first sensor is satisfied;

terminating the process in response to determining that the first condition is not satisfied;

enabling a second sensor with a second priority level in response to determining that the first condition is satisfied;

determining whether a second condition at the second sensor is satisfied; and terminating the process in response to determining that the second condition is not satisfied.

12. The device of claim 11, generating the sensor cascade sequence further comprises:

enabling a third sensor with a third priority level;

determining whether a third condition at the third sensor is satisfied; and terminating the process in response to determining that the third condition is not satisfied.

13. A non-transitory machine-readable medium encoded with instructions that, when executed by processors, cause the processors to perform a process comprising:

receiving a task by a device;

determining whether the task is high power consuming;

determining whether the task is associated with one or more high power-consuming modules in the device, in response to the determining that the task is high power consuming;

determining whether the task is associated with one or more sensors in the device, in response to the determining that the task is associated with one or more high power-consuming modules in the device;

enabling the high power-consuming modules to perform the task, in response to the determining that the task is not associated with one or more sensors in the device;

enabling a first processor in response to the determining that the task is high power consuming;

enabling a second processor in response to the determining that the task is not high power consuming; and performing the task using the first processor or the second processor.

14. The non-transitory machine-readable medium of claim 13, wherein the first processor is a high-speed processor and the second processor is a low-speed processor.

15. The non-transitory machine-readable medium of claim 13, wherein the process further comprises:

in response to the determining that the task is not associated with one or more high power-consuming modules in the device, enabling the first processor to perform the task.

16. The non-transitory machine-readable medium of claim 13, wherein the process further comprises:

in response to the determining that the task is associated with one or more sensors in the device:

determining a power consumption level for each of the one or more sensors;

determining a deciding factor of each of the one or more sensors based on context of the task;

generating a priority level of each of the one or more sensors based on the respective power consumption level and deciding factor;

generating a sensor cascade sequence to check each of the one or more sensors based on the priority level; and enabling the high power-consuming modules to perform the task.

17. The non-transitory machine-readable medium of claim 16, wherein the process of generating the sensor cascade sequence comprises:

enabling a first sensor with a first priority level;

determining whether a first condition at the first sensor is satisfied;

terminating the process in response to determining that the first condition is not satisfied;

enabling a second sensor with a second priority level in response to determining that the first condition is satisfied;

determining whether a second condition at the second sensor is satisfied; and terminating the process in response to determining that the second condition is not satisfied.

* * * * *